US007959391B2

(12) United States Patent
Lien

(10) Patent No.: US 7,959,391 B2
(45) Date of Patent: Jun. 14, 2011

(54) DRY WALL HAND TOOL

(76) Inventor: Chin-Hsiung Lien, El Monte, CA (US)

( * ) Notice: Subject to any disclaimer, the term of this patent is extended or adjusted under 35 U.S.C. 154(b) by 0 days.

(21) Appl. No.: 12/657,509

(22) Filed: Jan. 22, 2010

(65) Prior Publication Data

US 2010/0126026 A1 May 27, 2010

Related U.S. Application Data

(63) Continuation-in-part of application No. 12/288,835, filed on Oct. 22, 2008.

(51) Int. Cl.
*F16B 39/28* (2006.01)

(52) U.S. Cl. .......................... 411/133; 411/140; 411/401

(58) Field of Classification Search .................. 411/110, 411/133–135, 140, 321, 400, 401, 482, 485, 411/948

See application file for complete search history.

(56) References Cited

U.S. PATENT DOCUMENTS

| | | | | | |
|---|---|---|---|---|---|
| 248,393 | A * | 10/1881 | Berry | ............................ | 411/133 |
| 793,269 | A * | 6/1905 | Black | ............................ | 411/140 |
| 1,201,295 | A * | 10/1916 | Hendee | ...................... | 248/217.4 |
| 5,059,077 | A * | 10/1991 | Schmid | ......................... | 411/400 |
| 5,397,092 | A * | 3/1995 | Black | ............................ | 248/490 |
| 5,439,338 | A * | 8/1995 | Rosenberg | .................... | 411/400 |
| 6,676,350 | B1 * | 1/2004 | McSherry et al. | ............ | 411/135 |
| D552,976 | S * | 10/2007 | Gaudron | ........................ | D8/387 |
| 7,713,013 | B2 * | 5/2010 | Sedgwick et al. | ............ | 411/411 |
| 2006/0056939 | A1 * | 3/2006 | Ernst et al. | .................... | 411/400 |

* cited by examiner

*Primary Examiner* — Flemming Saether

(74) *Attorney, Agent, or Firm* — Raymond Y. Chan; David and Raymond Patent Firm

(57) ABSTRACT

An dry wall hand tool for a dry wall includes a pusher handle and a penetrating pin including an elongated pin body having a tail end portion protruding from the pusher handle and a sharp penetrating tip for initially penetrating into the dry wall to form a hole thereat in a tool-less manner when a rotational pushing hand force is applied at the pusher handle. The dry wall hand tool further includes locking arrangement including a retention pin slidably extended from the pusher handle at a position that the retention pin is spaced apart from the penetrating pin, wherein the retention pin is arranged for penetrating into the dry wall after the penetrating pin penetrated into the dry wall, such that the pusher handle is securely locked up by the retention pin to prevent the pusher handle being rotated to remove the penetrating pin from the dry wall.

6 Claims, 9 Drawing Sheets

DRY WALL HAND TOOL

CROSS REFERENCE OF RELATED APPLICATION

This is a Continuation In Part application of a non-provisional application having an application Ser. No. 12/288,835 and a filing date of Oct. 22, 2008.

BACKGROUND OF THE PRESENT INVENTION

1. Field of Invention

The present invention relates to an affixing pin, and more particularly to a dry wall hand tool for penetrating into a dry wall and allowing the user to do so easily without applying as much pushing force as the conventional affixing pin requires and without using tools.

2. Description of Related Arts

Referring to FIG. 1 of the drawings, a conventional affixing pin for dry wall comprises a sharp inserting head 1, a pin body 2, and a pusher handle 3. The sharp inserting head 1, having a substantially circular cross section, is provided at a tip end portion of the pin body 2 for conveniently inserting through objects such as a dry wall. It is generally extended portioned rearwardly and conically with an increasing diameter towards the pusher handle 3 which usually is as elongated uniform cylinder shape. The sharp tip end portion allows the sharp inserting head 1 to insert into the dry wall surface then, under a tip end portion pushing action, the sharp inserting head 1 pushes the dry wall material radially to create a hole in the dry wall for the affixing pin to further insert in it. The pusher handle 3 couples with the pin body 2 coaxially and has a flat surface at one end portion for user to conveniently exert force such that the sharp inserting head 1 can penetrate through object easier. The pusher handle 3 of such conventional dry wall affixing pin usually has a twisting handle designed for user to grab on and allow the user to provide a twisting motion while inserting through a dry wall, thus rend portionering the hole-making process easier.

Moreover, there exist a number of disadvantages for this conventional affixing pin. First, although this kind of affixing pin has been commonly used for a long time, most of the modifications and improvements are limited to the pusher handle 3 for allowing an easier or more convenient grab for the user to perform the pushing or the twisting action. It is true that modification in the pusher handle 3 may improve the inserting process but not too many modifications were ever invented on the sharp inserting head 1 and pin body 2.

Second, even though the pusher handle 3 is designed and improved such that penetration of a dry wall can be achieved in the most efficient manner, it does not mean that the construction and design of the pin body 2 and the sharp inserting head 1 are such that easy and effective penetration of the pin body 2 can be ensured. Herein lays the distinction between efficiency and effectiveness. For example, one may use the maximum efficient of force to accomplish a particular penetration of a dry wall at a very low effectiveness given the construction and design of the pin body 2 and the sharp inserting head 1. In the contrary, one may accomplish a particular penetration of a dry wall in a very effective manner yet with little efficiency due to poor design of the pusher handle. Most of the improvements of conventional affixing pin such as the one described above are devoted to improvement of efficiency.

Third, almost all sharp inserting heads 1 and the pin bodies 2 of the conventional affixing pins have substantially circular cross sections. This makes penetration of the pin bodies into the dry wall very difficult and the user may even need to use some sorts of instruments for accomplishing the penetration. Since the diameter of the pin body 2 is increasing with decreasing distance from the pusher handle 3, when the penetration process is in progress, there exists gradual destruction to the dry wall, forming a hole thereon. As a matter of fact, however, when the pin body 2 has a substantially circular cross section, the dry wall will be difficult to be penetrated, and that excessive shear force will make the resulting not circular in shape, thereby loosening the supposedly fit engagement between the pin body 2 and the dry wall.

Fourth, many of such conventional affixing pins are used for hanging materials such as calendar posters, clothes, picture frame, and etc. In these applications, a hanging downward force is usually applied at the pusher handle 3 and it creates a moment only at a pivot point at the top portion of the pin body 2 against the dry wall. Another existing problem of such conventional affixing is that the pivot point is not strong enough for support if the affixing pin is hanging heavy materials thus creating a strong moment that might damage the dry wall or even make the pin head and body to slip out from the wall.

Finally, conventional affixing pins are usually allowed to rotate freely once the affixing pin is inserted into the dry wall. It is very often that the affixing pin might be experiencing different pulling or pushing forces in many different directions while hanging objects. These forces could cause the affixing pin to rotate while it is inserted into the dry wall. The rotation of the affixing pin can overcome the static friction between the pin body 2 and the dry wall material thus allowing the pin body 2 to slide easily inside the dry wall hole. Under this situation, the hanging affixing pin can slide out of the dry wall hole and fail the hanging objective.

SUMMARY OF THE PRESENT INVENTION

An object of the present invention is to provide a dry wall hand tool, wherein the locking arrangement is able to lock the rotational movement of the dry wall hand tool rotatably moving along a rotational shaft of the elongated pin body of the penetrating pin after the penetrating pin is penetrated into the dry wall to biasing against thereof via the biasing surface of the pusher handle, so as to prevent the penetrating pin being loosened via the rotational movement thereof.

Another object of the invention is to provide a dry wall hand tool which requires less penetrating force for the whole affixing pin to penetrating through the wall, while at the same time maximizing the effectiveness of the penetration process.

Another object of the present invention is to provide a dry wall hand tool which is capable of effectively and efficiently penetrating into a dry wall while maintaining fit engagement between the affixing pin and the dry wall. In other words, the affixing pin will not be loosened after penetrating into the dry wall.

Another object of the present invention is to provide a dry wall hand tool which can minimize the damage of wall texture when penetrating through wall. Moreover, the affixing pin can easily penetrate the dry wall in a tool-less manner.

Another object of the invention is to provide a dry wall hand tool which the pin can function as a hanger to supportively hang objects and to provide a better hanging support.

Another object of the invention is to provide a dry wall hand tool which does not involve complicated mechanical structure so as to minimize the manufacturing cost of the present invention.

Accordingly, in order to accomplish the above object, the present invention provides a dry wall hand tool adapted for making a hole on a dry wall, comprising:

a pusher handle adapted for a user grabbing and holding thereat in a tight and stable manner; and a penetrating pin having a sharp penetrating tip, a tail end portion securely and coaxially coupling with the pusher handle, an elongated pin body integrally extended from the tail end portion to the sharp penetrating tip, and a sharp edge integrally extended along the pin body from the sharp penetrating tip to the tail end portion, in such a manner that when a pushing hand-force is applied by a hand of the user at the pusher handle coaxially towards the penetrating pin, the sharp penetrating tip of the penetrating pin is arranged to initially penetrate into the dry wall while the sharp edge of the penetrating pin is arranged to substantially assist the pin body in breaking through the dry wall to form the hole thereat in a tool-less manner.

These and other objectives, features, and advantages of the present invention will become apparent from the following detailed description, the accompanying drawings, and the append portioned claims.

DETAILED DESCRIPTION OF THE PREFERRED EMBODIMENT

Figure 1:
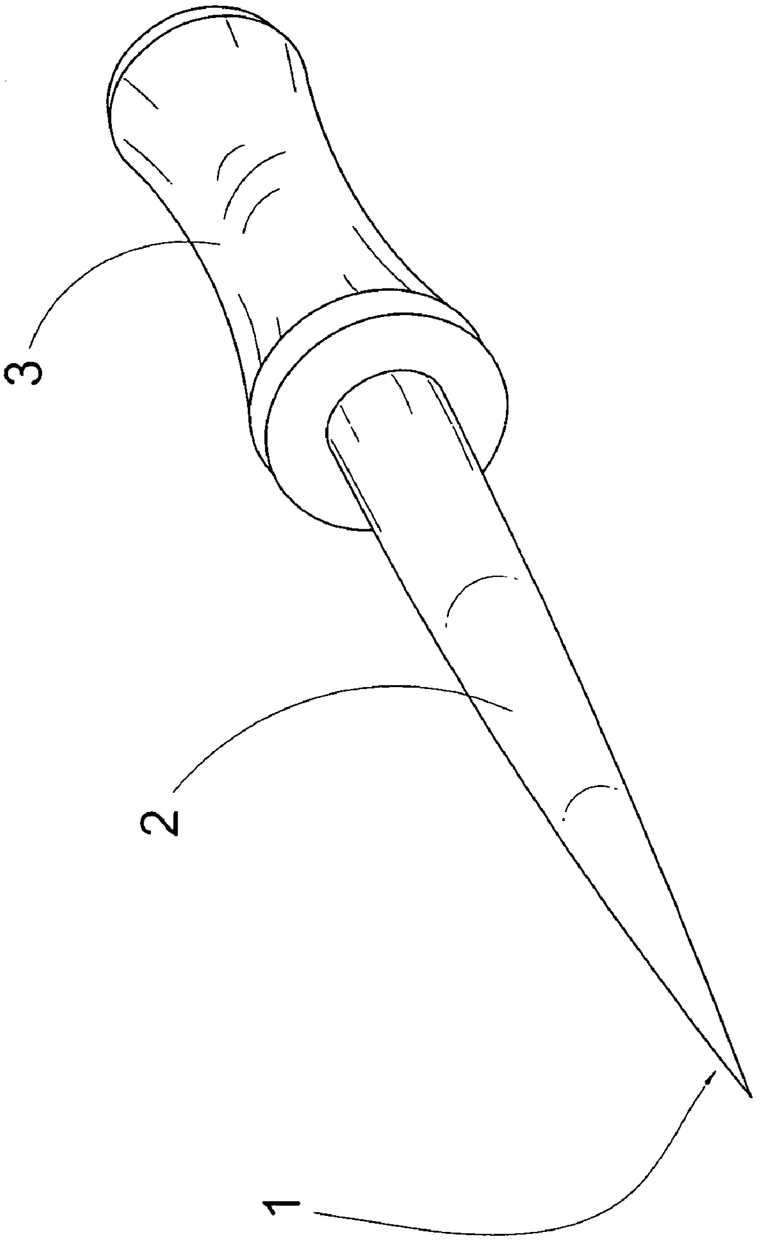
FIG.1 PRIOR ART
FIG. 1 is a conventional dry wall affixing pin.
Figure 2:
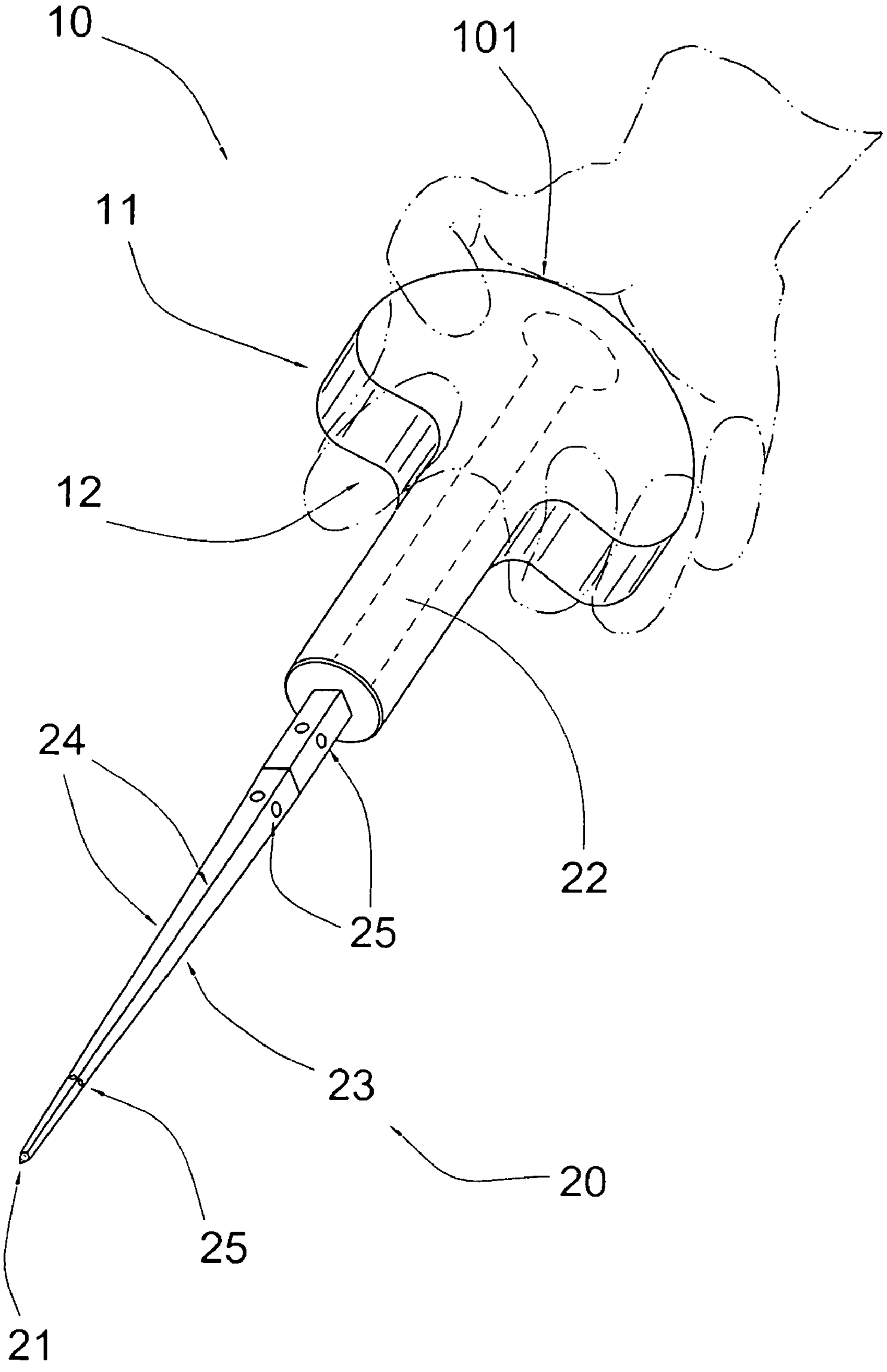
FIG. 2 is a perspective view of a dry wall hand tool according to a first preferred embodiment of the present invention.
Figure 3:
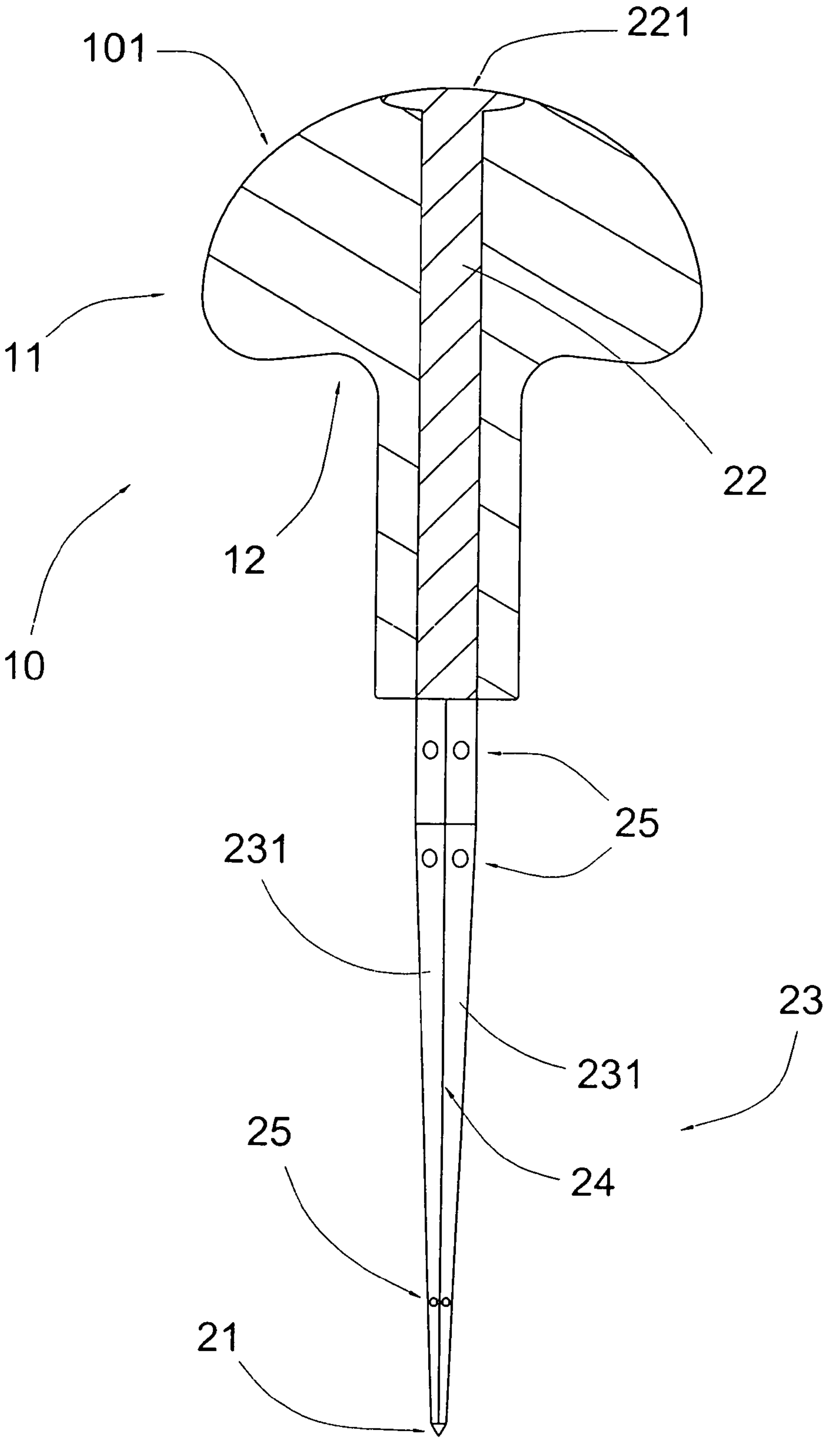
FIG. 3 is a sectional view of the dry wall hand tool according to the above first preferred embodiment of the present invention.
Figure 4:
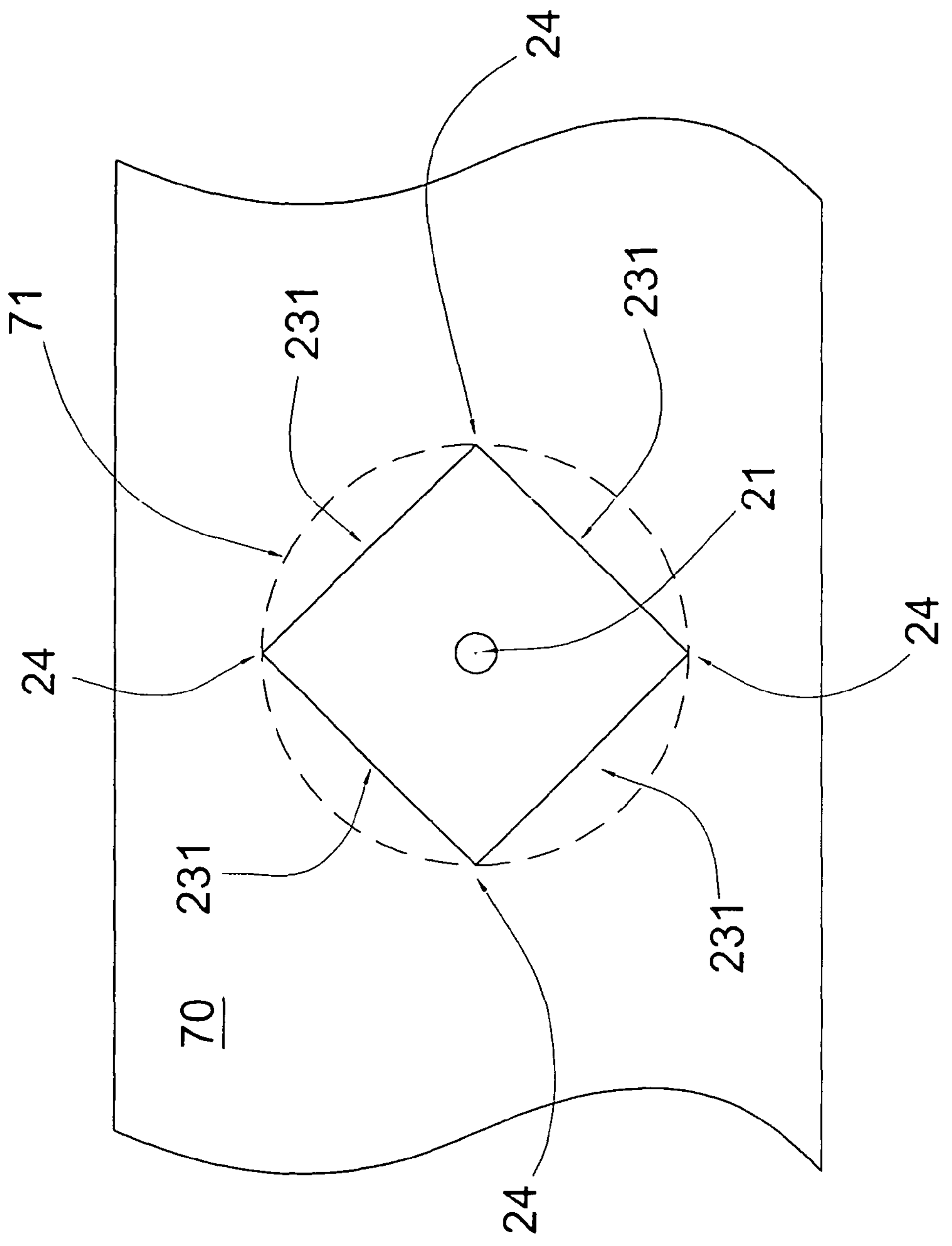
FIG. 4 is a cross-sectional view of the penetrating pin of the dry wall hand tool according to the above first embodiment of the present invention, illustrating the circular hole being formed on the dry wall by the non-circular penetrating pin.

Referring to FIGS. 2 to 4 of the drawings, a dry wall hand tool adapted for making a hole 71 on a dry wall 70 according to a preferred embodiment of the present invention is illustrated, wherein the dry wall hand tool comprises a pusher handle 10 and a penetrating pin 20.

According to the first embodiment, the pusher handle 10 is adapted for a user grabbing and holding thereat in a tight and stable manner, wherein the pusher handle 10 has an enlarged pusher head 11 and a control portion 12 extended from the enlarged pusher head 11 for accommodating corresponding fingers of the user so as to enable the user grabbing and holding at the pusher handle 10 in a tight and stable manner. Therefore, the user is able to grab the pusher handle 10 for pushing the penetrating pin 20 towards the dry wall 70 with the optimal amount of force and at an optimal direction.

The penetrating pin 20 has a sharp penetrating tip 21, a tail end portion 22 securely and coaxially coupling with the pusher handle 10, an elongated pin body 23 integrally extended from the tail end portion 22 to the sharp penetrating tip 21, and a sharp edge 24 integrally extended along the pin body 23 from the sharp penetrating tip 21 towards the tail end portion 22, in such a manner that when a pushing hand-force is applied by a hand of the user at the pusher handle 10 coaxially towards the penetrating pin 20, the sharp penetrating tip 21 of the penetrating pin 20 is arranged to initially penetrate into the dry wall 70 while the sharp edge 24 of the penetrating pin 20 is arranged to substantially assist the pin body 23 in breaking through the dry wall 70 to form the hole 71 thereat in a tool-less manner.

Accordingly, the pusher handle 10, which is made of plastic, wooden or metallic materials, is ergonomically designed and crafted to allow the user to stably and effectively apply optimal amount of pressure for pressing the penetrating pin 20 toward the dry wall 70 in an optimally coaxial manner. More specifically, the enlarged pusher head 11 has a rounded exterior contour for allowing the user to use his or her palm for applying pressure towards the dry wall 70 without imparting a significant amount of pain onto that corresponding finger. On other words, the user may use two of his fingers (such as the index finger and the middle finger) to hold the pusher handle 10 and control the direction and stability of the applied pressure, and one of his thumb palm to exert a predetermined or a desirable amount of force toward the penetrating pin 20 so as to apply the corresponding amount of pressure against the dry wall 70. It is important to mention that when the pusher handle 10 is properly held by the user, he or she is able to exert a coaxial force with respect to the penetrating pin 20 for effectively and efficiently penetrating the dry wall 70.

The penetrating pin 20 is made of strong metallic materials such as stainless steel and adapted for penetrating through the dry wall 70. Accordingly, the sharp edge 24 of the penetrating pin 20 is a straight edge extended along the pin body 23 from the sharp penetrating tip 21 towards the tail end portion 22.

As shown in FIGS. 3 and 4, the pin body 23, having a non-circular cross section, has a plurality of flat surfaces 231 to define the sharp edge 24 along a common line between the two adjacent flat surfaces 231. More specifically, the pin body 23 has a quadrilateral cross section defining four of the flat surfaces 231 and four of the sharp edges 24, wherein the sharp penetrating tip 21 of the penetrating pin 20 has a conical shape. Therefore, when the penetrating pin 20 is inserted into the dry wall 70, the hole 71 with the quadrilateral shape is formed. Once the pin body 23 is penetrated into the dry wall 70, a rotational hand force is applied at the pusher handle 10 to drive the pin body 23 to rotate, such that the sharp edge 24 of the penetrating pin 20 abrades at the dry wall to form the hole 71 in circular shape. In other words, the user is able to choose the shape of the hole 71 by only pushing the penetrating pin 20 into the dry wall 70 or by consequently pushing and rotating the penetrating pin 20 into the dry wall 70.

It is worth to mention that the non-circular cross sectional pin body 23 is adapted to maintain secure engagement between the penetrating pin 20 and the dry wall 70 after penetration thereof. It is important to mention that when the pin body 23 is having a non-circular cross section (such as the quadrilateral cross section mentioned above), it would be very easy and convenient for the pin body 23 to break the relevant portion of the dry wall 70 when it is rotatably driven to penetrate it. In other words, the four sharp edges 24 are adapted to controllably and effective sever the corresponding portion of the dry wall 70 so as to allow easy and efficient penetration of the penetrating pin 20 into the dry wall 70. It is worth noting that the quadrilateral cross section can be a rectangular cross section, a square cross section or even a rhombus cross section. Other cross sectional shapes are possible, such as a triangular cross section, hexagonal cross section, as long as there is at least one sharp edge 24 formed on the pin body 23.

As shown in FIGS. 2 to 4, the pin body 23 has a circumferential size gradually reducing towards the sharp penetrating tip 21. The penetrating pin 20 further comprises a plurality of depth markers 25 spacedly provided on the pin body 23 for indicating a depth of penetration of the penetrating pin 20, wherein each of the depth markers 25 also illustrates said corresponding circumferential size of the pin body 23 in responsive to a size of the hole 71 formed on the dry wall 70. In other words, each of the depth markers 25 will show the corresponding size of the pin body 23 at the location where the depth marker 25 is positioned, so that the user may observe the diameter of the hole 71 formed on the dry wall 70 as a result of the penetration.

Moreover, the tail end portion 22 of the penetrating pin is embedded into the pusher handle 10 with a top end 221 of the penetrating pin 20 extended to contact with an outer top surface 101 of the pusher handle 10 for ensuring said pushing hand-force being coaxially transmitted to the penetrating pin 20. So a user, whenever necessary, may reinforce the penetrating force by hammering the pusher handle 10 without causing substantial damage thereof and with maximum efficiency, because the distance between the penetrating pin 20 and the hammering instrument can be minimized. It is important to emphasize, however, that one of the main features of the present invention is to provide an affixing pin which is capable of effectively and efficiency penetrating into the dry wall 70 in a tool-less manner. As a result, the hammering of the pusher handle 10 just described serves solely the purpose of reinforcing of penetration power whenever necessary.

In order to further enhance the efficiency and effectiveness of the dry wall hand tool, the sharp penetrating tip 21 of the penetrating pin 20 has a conical shape for facilitating easy initial penetration by the penetrating pin 20 into the dry wall 70. When pressured is exerted to push the penetrating pin 20 against the dry wall 70, the conically-shaped sharp penetrating tip 21, owning to its sharp structural property, will easily make an initial penetration into the dry wall 70 while the pin body 23 having the non-circular cross section will continue effective and efficient penetration of the dry wall 70 once the initial penetration is made.

Finally, each of the outer surfaces of the pin body 23 is slanted with respective to horizontal so that the overall diameter of the pin body 23 at any given height thereof is increasing with decreasing distance to the pusher handle 10.

Figure 5:
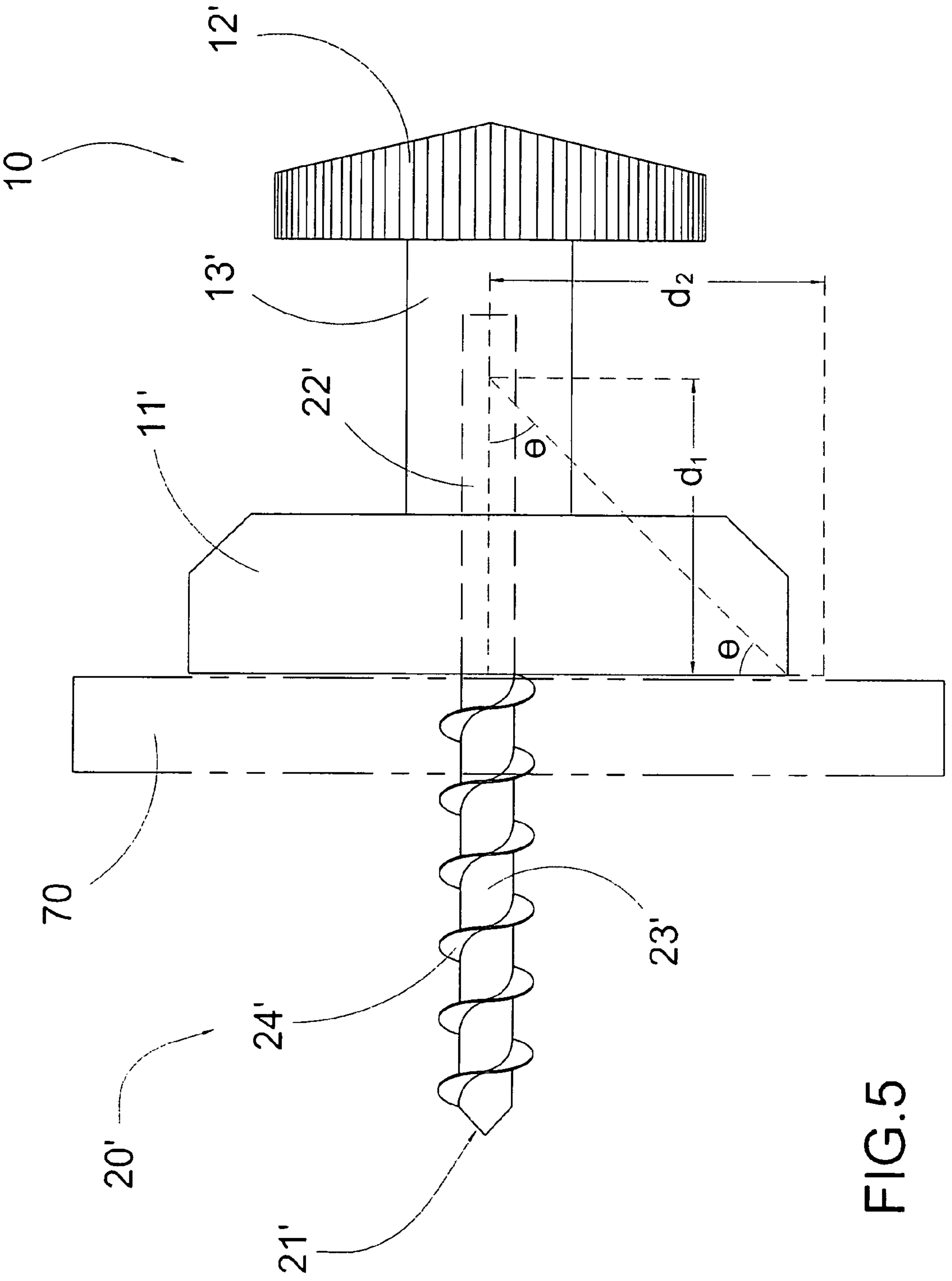
FIG. 5 is a sectional view of the dry wall hand tool according to a second preferred embodiment of the present invention.

As shown in FIG. 5, a dry wall hand tool of a second embodiment illustrates an alternative mode of the first embodiment, wherein the dry wall hand tool of the second embodiment comprises a pusher handle 10' and a penetrating pin 20'.

According to the second embodiment, the pusher handle 10' is adapted for a user grabbing and holding thereat in a tight and stable manner.

The penetrating pin 20' has a sharp penetrating tip 21', a tail end portion 22' securely and coaxially coupling with the pusher handle 10', an elongated pin body 23' integrally extended from the tail end portion 22' to the sharp penetrating tip 21', and a sharp edge 24' integrally extended along the pin body 23' from the sharp penetrating tip 21' towards the tail end portion 22', in such a manner that when a pushing hand-force is applied by a hand of the user at the pusher handle 10' coaxially towards the penetrating pin 20', the sharp penetrating tip 21' of the penetrating pin 20' is arranged to initially penetrate into the dry wall 70 while the sharp edge 24' of the penetrating pin 20' is arranged to substantially assist the pin body 23' in breaking through the dry wall 70 to form the hole 71 thereat in a tool-less manner.

As shown in FIG. 5, the pusher handle 10' comprises an inner handle member 11', an outer handle member 12' and a hanger member 13' extended between the inner handle member 11' and the outer handle member 12', wherein the pusher handle 10' is adapted for accommodating corresponding fingers of the user so as to enable the user grabbing and holding at the pusher handle 10' in a tight and stable manner. Therefore, the user is able to grab the pusher handle 10' for pushing the penetrating pin 20' towards the dry wall 70 with the optimal amount of force and at an optimal direction. In addition, the hanger member 13' is adapted for allowing a user to hang an external object at the dry wall 70 after the pin body 23' is penetrated into the dry wall 70.

The penetrating pin 20' is made of strong metallic materials such as stainless steel and adapted for penetrating through the dry wall 70. The pin body 23', having a circular cross section, has a uniform diameter extended from the sharp penetrating tip 21' towards the tail end portion 22'. The sharp edge 24' of the penetrating pin 20' is integrally protruded from an outer surface of the pin body 23' and is extended along the pin body 23' from the sharp penetrating tip 21' to the tail end portion 22' in a spiral manner. Accordingly, the spiral sharp edge 24' is adapted to facilitate easy penetration of the penetrating pin 20' into the dry wall 70, in such a manner that when the penetrating pin 20' is rotatably pressed towards the dry wall 70 by the pusher handle 10', the sharp penetrating tip 21' is arranged to penetrate the dry wall 70 in a tool-less manner, in which the spiral sharp edge 24' substantially assists in optimally breaking the dry wall 70 so as to maintain an optimal performance of the present invention in penetrating the dry wall 70 while maintaining secure engagement between the penetrating pin 20' and the dry wall 70 after penetration thereof.

In order to further enhance the efficiency and effectiveness of the dry wall hand tool, the sharp penetrating tip 21' of the penetrating pin 20' has a conical shape for facilitating easy initial penetration by the penetrating pin 20' into the dry wall 70. When pressured is exerted to push the penetrating pin 20' against the dry wall 70, the conically-shaped sharp penetrating tip 21', owning to its sharp structural property, will easily make an initial penetration into the dry wall 70 while the pin body 23' will continue effective and efficient penetration of the dry wall 70 in a rotational manner once the initial penetration is made.

According to preferred embodiment, the pusher handle 10', which can be made of plastic, wooden or metallic materials, is ergonomically designed and crafted to allow the user to stably and effectively apply an optimal amount of pressure for pressing the penetrating pin 20' toward the dry wall 70 in an optimally coaxial manner. The pusher handle 10' is adapted for not only being grabbed by the hand of the user but also for allowing the user to hang an external object, such as a cap, on it. More specifically, as shown in FIG. 5 of the drawings, in order to maximize the sustainability of the external object by the affixing pin, a perpendicular distance ($d_1$) between the outer handle member and a mid-point of the hanger member 13' is equal the distance ($d_2$) between that mid-point of the hanger member 13' and an outer corner tip of the hanger member 13' such that the angle of inclination θ between $d_1$ and $d_2$ is approximately 45 degrees.

Figure 6:
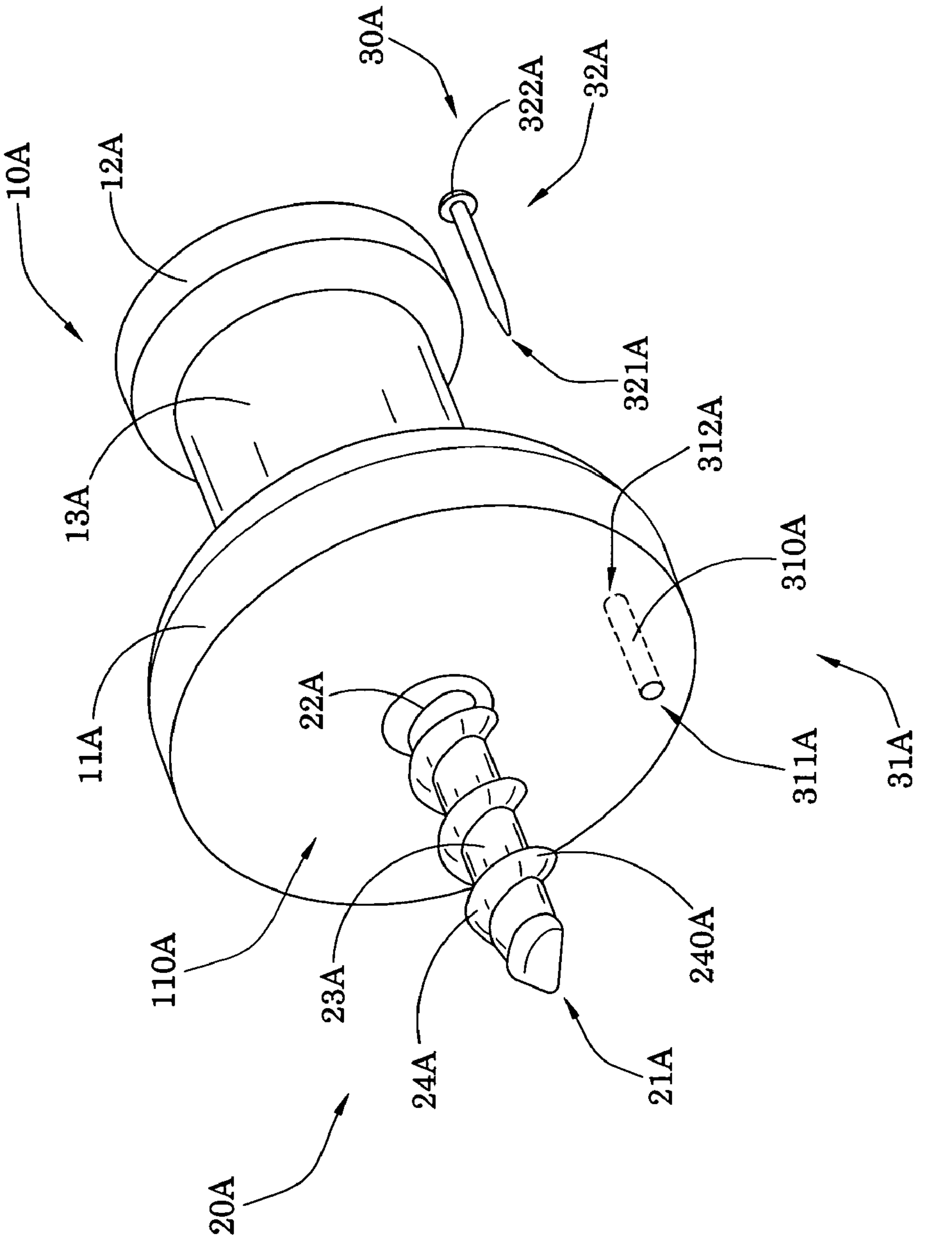
FIG. 6 is a perspective view of a dry wall hand tool according to a third preferred embodiment of the present invention.
Figure 7:
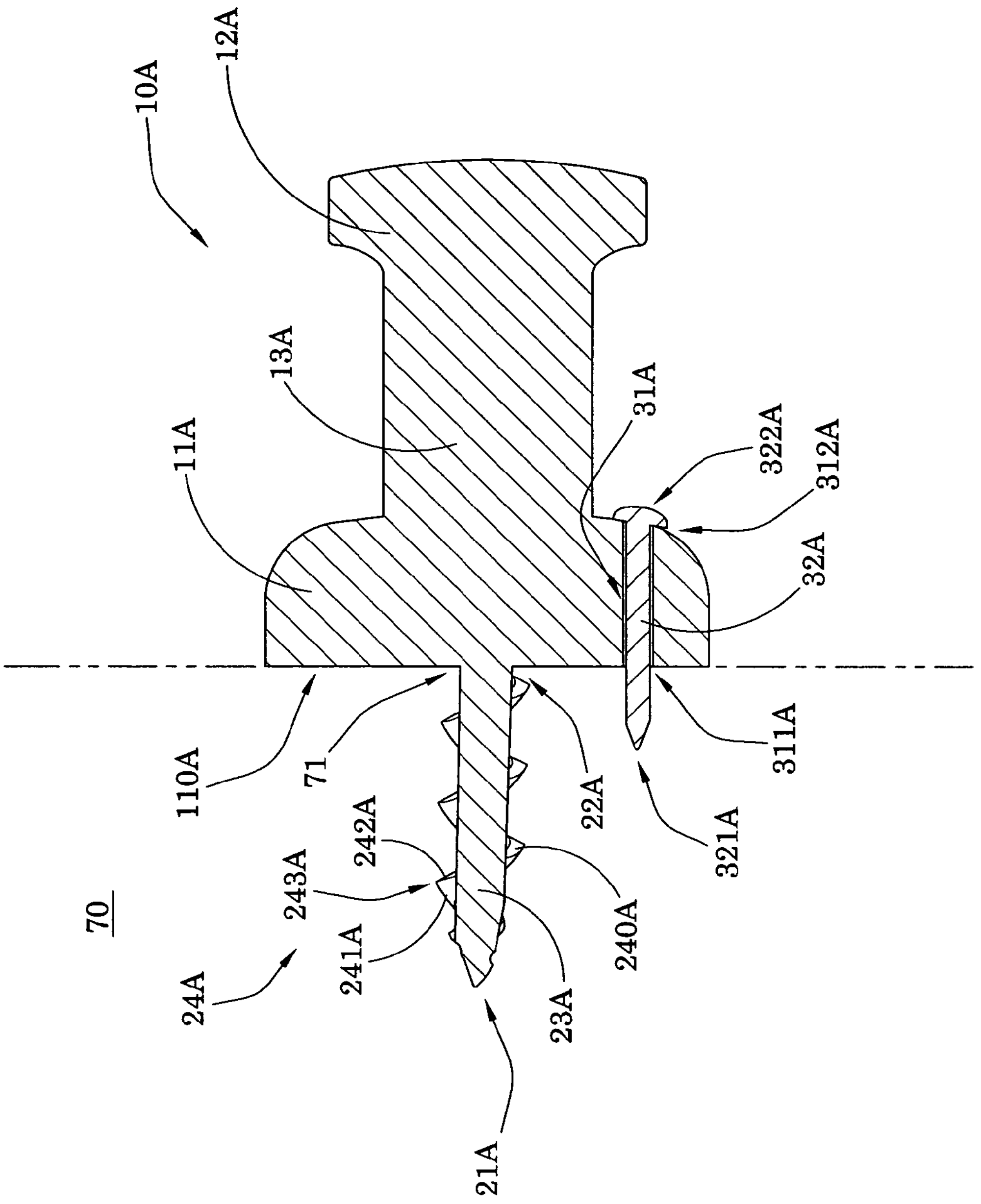
FIG. 7 illustrates the dry wall hand tool affixed to the dry wall according to the above third embodiment of the present invention.

Referring to FIGS. 6 and 7, a dry wall hand tool according to a third embodiment of the present invention is illustrated, wherein the dry wall hand tool comprises a pusher handle 10A and a penetrating pin 20A. Accordingly, the pusher handle 10A is adapted for a user grabbing and holding thereat in a tight and stable manner.

The penetrating pin 20A has a sharp penetrating tip 21A, a tail end portion 22A securely and coaxially coupling with the pusher handle 10A, and an elongated pin body 23A integrally extended from the tail end portion 22A to the sharp penetrating tip 21A. Therefore, when a pushing hand-force is applied by a hand of the user at the pusher handle 10A inwardly toward the targeted object, such as dry wall, the sharp penetrating tip 21A of the penetrating pin 20A is arranged to initially penetrate into the dry wall 70. A sharp edge 24A is preferably further provided at an outer surface of the elongated pin body 23A, wherein the sharp edge 24A is integrally extended along the elongated pin body 23A from the sharp penetrating tip 21A toward the tail end portion 22A. Therefore, when the pusher handle 10A is being held to apply the hand force for pressing or pushing the penetrating pin 20A inwardly toward the dry wall 70, the sharp edge 24A of the penetrating pin 20A is arranged to substantially assist the pin body 23A in breaking through the dry wall 70 to form the hole 71 thereat in the tool less manner.

Accordingly, the pusher handle 10A comprises an inner handle member 11A, an outer handle member 12A and a hanger member 13A extended between the inner handle member 11A and the other handle member 12A, wherein the pusher handle 10A is adapted for accommodating corresponding fingers of the user so as to enable the user grabbing and holding at the pusher handle 10A in a tight and stable manner. Therefore, the user is able to grab the pusher handle 10A for pushing the penetrating pin 20A towards the dry wall 70 with the optimal amount of force and at an optimal direction. In addition, the hanger member 13A is adapted for hanging an external object at the dry wall 70 after the pin body 23A is affixed at the dry wall via penetrating thereinto.

The penetrating pin 20A is preferably made of strong metallic materials, such as stainless steel, so that the penetrating pin 20A provides a predetermined hardness for easily penetrating the penetrating pin 20A through the dry wall 70. The pin body 23A, preferably having a circular cross section, has a uniform diameter extended from the sharp penetrating tip 21A towards the tail end portion 22A. The sharp edge 24A of the penetrating pin 20A is integrally protruded form an outer surface of the pin body 23A and is extended along the pin body 23A from the sharp penetrating tip 21A to the tail end portion 22A in a spiral manner. Therefore, the spiral sharp edge 24A is able to facilitate easy penetration of the penetrating pin 20A into the dry wall 70 manually in the tool less manner. Thus, the penetrating pin 20A is rotatably pressed toward the dry wall 70 by the pusher handle 10A through the rotational pushing hand-force.

The sharp penetrating tip 21A is arranged to penetrate into the dry wall 70 in a tool-less manner, in which the spiral sharp edge 24A substantially assists in optimally breaking the dry wall 70 for penetrating the elongated pin body 23A thereinto, so as to maintain an optimal performance of the present invention in penetrating the dry wall 70 while maintaining secure engagement between the penetrating pin 20A and the dry wall 70 after penetration thereof.

In order to further enhance the efficiency and effectiveness of the dry wall hand tool, the sharp penetrating tip 21A of the penetrating pin 20A has a conical shape for facilitating easy initial penetration by the penetrating pin 20A into the dry wall 70. When pressured is exerted to push the penetrating pin 20A against the dry wall 70, the conically-shaped sharp penetrating tip 21A, owning to its sharp structural property, will easily make an initial penetration into the dry wall 70 while the pin body 23A will continue effective and efficient penetration of the dry wall 70 in a rotational manner once the initial penetration is made.

More specifically, according to the preferred embodiment of the present invention, the sharp edge 24A is preferably a continuous helical ridge integrally and outwardly protruding at the outer surface of the pin body 23A to form a plurality of threads 240A circling the outer surface in the spiral manner, so that the dry wall hand tool is able to be held at the pusher handle 10A for coaxially and rotatably applying the hand force to penetrate the penetrating pin 20A into the dry wall 70 manually, so as to stably and efficiently affix the dry wall hand tool thereat in the tool-less manner.

Each of the threads 240A of the continuous helical ridge of the sharp edge 24A has a first face 241A and a second face 242A outwardly and integrally protruding from the outer surface of the elongated pin body 23A to intersect with the first face 241A, so as to form a sharp end 243A of the continuous helical ridge of the sharp edge 24A. Therefore, the sharp edge 24A extended at the outer surface of the pin body 23A in the spiral manner is able to inwardly and rotatably break into the dry wall or other targeted object via the sharp end 243A of the sharp edge 24A for further assisting the dry wall hand tool manually being drilled into the dry wall 70 to form the hole 71 thereat.

In addition, the first face 241A of each of the threads 240A is preferably tilted at a predetermined angle α between two tangent vectors of the first face 241A and the outer surface of the elongated pin body 23A. The second face 242A of each of the threads 240A is preferably formed a predetermined angle β between two tangent vectors of the second face 242A and the outer surface of the elongated pin body 23A, wherein the angle α is preferably larger then the angle β. More specifically, the angle α is preferably larger then 90°, and the angle β is preferably and substantially equal or less then 90°, in such a manner that when the hand force is applied to the penetrating pin 20A via the pusher handle 10A, the first face 241A is able to easily break the dry wall 70 to guide the pin body 23A inwardly penetrating through the dry wall 70 and the second face 242A having the angle β equal or less then 90° is able to efficiently prevent the penetrating pin 20A backwardly and counterclockwisely loosened to fall off the dry wall 70.

As mentioned above, the threads 240A of the sharp edge 24A extending out of the outer surface of the pin body 23A from the penetrating tip 21A to the tail end portion 22A of the penetrating pin 20A in the spiral manner preferably have a distribution density gradually decreased from the sharp penetrating tip 21A to the tail end portion 22A. In other words, the elongated pin body 23A has more threads 240A near the penetrating tip 21A, which has higher distribution density, and less threads 240A near the tail end portion 22A of the penetrating pin 20A, which has lower distribution density, in such a manner that the sharp penetrating tip 21A and the higher density threads of the sharp edge 24A is able to relatively easier to rotatably penetrate the penetrating pin 20A toward the dry wall to initiate the breaking force for penetrating the pin body 23A through the dry wall 70. The less density threads of the sharp edge near the tail end portion 22A is able to speed up the rotational speed for rotatably pressing the dry wall hand tool into the dry wall 70, so as to stably affix the dry wall hand tool thereat.

According to preferred embodiment, the pusher handle 10A, which can be made of plastic, wooden or metallic materials, is ergonomically designed and crafted to allow the user to stably and effectively apply an optimal amount of pressure for pressing the penetrating pin 20A toward the dry wall 70 in an optimally coaxial manner. The pusher handle 10A is adapted for not only being grabbed by the hand of the user but also for allowing the user to hang an external object, such as a cap, on it.

As described above, the inner handle member 11A has a biasing surface 110A located at a position between the inner handle member 11A and the dry wall 70 to bias against the dry wall 70 when the dry wall hand tool is affixed thereat. In other words, the penetrating pin 20A is integrally protruding from the biasing surface 110A to integrally extend therefrom, such that when the pusher handle 10A is driving the penetrating pin 20A to be rotatably pressed to penetrate into the dry wall 70, the biasing surface 110A is engaging with the dry wall 70 to further provide a supporting force at the hanger member 13A for stably and strongly supporting a hanging object being hanged thereat via the biasing force between the biasing surface 110A and the dry wall 70.

It is appreciated that the penetrating pin 20A is preferably protruded from a central portion of the biasing surface 110A of the inner handle member 11A, so that the biasing force at the biasing surface 110A is able to be evenly distributed, so as to maximize the supporting force at the hanger member 13A, so as to coaxially align the penetrating pin 20A with the pusher handle 10A to optimize operation of rotatably pressing the penetrating pin 20A via the pusher handle 10A.

It is appreciated that, as illustrated in FIG. 5, a perpendicular distance between the outer handle member and a mid-point of the hanger member 13A is preferably equal to a distance between the mid-point of the hanger member 13A and an outer corner tip of the hanger member 13A, which is similar as the structure as described in the second preferred embodiment of the present invention, such that an angle of the inclination between $d_1$ and $d_2$ is approximately 45 degrees, so as to optimize and maximize the sustainability of the dry wall hang tool for hanging external object by the hanger member 13A.

In order to further prevent the rotatably penetrated elongated pin body 23A being rotatably unscrewed or loosened to disengage with the dry wall, a locking arrangement 30A is further provided to prevent the undesired rotational movement between the dry wall and the dry wall hand tool.

The aligning arrangement 30A comprises a positioning hole 31A and a retention pin 32A slidably extended from the pusher handle 10A. The positioning hole 31A is preferably located at the inner handle member 11A of the pusher handle 10A. The retention pin 32A of the locking arrangement 30A is provided for slidably penetrating into the dry wall 70 through the positioning hole 31A at the inner handle member 11A of the pusher handle 10A after the penetrating pin 20A is penetrated into the dry wall to affix the dry wall hand tool, so that the retention pin 32A is able to fix a rotational movement of the biasing surface 110A of the inner handle member 11A to prevent the pusher handle 10A of the dry wall hand tool rotatably moving along a tangent vector of an axial of the penetrating pin 20A, so as to prevent the loosening of the dry wall hand tool.

In other words, the positioning hole 31A is provided for guiding the retention pin 32A breaking into the dry wall 70 and locking the rotational movement of the penetrating pin 20A rotatably moving along the elongated pin body 23A as a rotational shaft of the dry wall hand tool, so as to prevent the penetrating pin 20A being outwardly and rotatably moved via the spiral shaped sharp edge 24A to loosen the dry wall hand tool.

As shown in FIGS. 6 and 7 of the drawings, the positioning hole 31A according to the preferred embodiment is preferably provided at the inner handle member 11A to form an elongated channel 310A therewithin. The elongated channel 310A has an inner opening 311A located at the biasing surface 110A of the inner handle member 11A, and an opposed outer opening 312A located at the other opposed side of the biasing surface 110A of the inner handle member 11A to coaxially align with the inner opening 311A, such that the retention pin 32A is able to be guided to penetrate into the dry wall 70 through the positioning hole 31A from the outer opening 312A to the inner opening 311A thereof, so as to lock the rotational movement of the dry wall hand tool in respect of a rotational shaft of the penetrating pin 20A.

It is worth to mention that the positioning hole 31A is preferably located at a position adjacent to the outer peripheral edge of the inner handle member 11A, so that a retention force for locking the rotational movement of the dry wall hand tool via the locking arrangement 30A is optimized by maximizing a distance between the penetrating pin 20A and the positioning hole 31A to maximize the torque force for retaining the rotational movement of the biasing surface 110A of the inner handle member 11A.

Accordingly, the retention pin 32A preferably has an elongated shape having a sharp tip portion 321A at one end and an enlarged pushing head 322A at the other end of the retention pin 32A at a position perpendicular to the elongated shaped retention pin 32A. The retention pin 32A is detachably coupled with the pusher handle 10A through the positioning hole 31A to lock up the pusher handle 10A at the dry wall 70 in a rotatably movable manner. Therefore, the hand force is able to be easily applied at the pushing head 322A of the retention pin 32A for initially breaking the retention pin 32A into the dry wall 70 via the sharp tip portion 321A thereof for locking the rotational movement of the dry wall hand tool.

As will be readily appreciated by one skill in the art, the pushing head 322A of the retention pin 32A is preferably an enlarged surface, so as to conveniently apply the pressing hand force thereat to manually affix the retention pin 32A at the dry wall 70. The pushing head 322A is also provided for limiting a depth of the retention pin 32A penetrating into the dry wall 70. The retention pin 32A has a length longer than the elongated channel 310A of the positioning hole 31A, so that the retention pin 32A is able to penetrate through the positioning hole 31A to break into the dry wall 70. Preferably, the retention pin 32A has a length shorter than a length of the penetrating pin 20A and a circumferential size smaller than a circumferential size of the penetrating pin 20A.

The elongated channel 310A is extended within the inner handle member 11A at a position substantially parallel to the elongated pin body 23A of the penetrating pin 20A, so that the retention pin 32A is able to parallelly insert into the dry wall 70 for maximizing the torque force between the penetrating pin 20A and the retention pin 32A to optimize the locking arrangement 30A and to minimize a required hand force applied for manually pressing the retention pin 32A penetrating into the dry wall 70, so as to fix the rotational movement of the penetrating pin 20A to prevent the dry wall hand tool being loosened to fall of the dry wall 70.

It is appreciated that the elongated channel 310A of the positioning hole 31A may also slightly inclined at an angle in respect to a normal vector of a surface of the dry wall 70 to slightly non-parallel to elongated pin body 23A of the penetrating pin 20A, so as to increase the length of the elongated channel 310A of the positioning hole 31A. The elongated channel 310A may inclined at a position that a distance between the outer opening 312A and the penetrating pin 20A is slighter longer than a distance between the inner opening 311A and the penetrating pin 20A, so that the user may have a relatively larger space for easily applying the hand force at the pushing head 322A of the retention pin 32A for manually penetrating the retention pin 23A into the dry wall 70.

Figure 8:
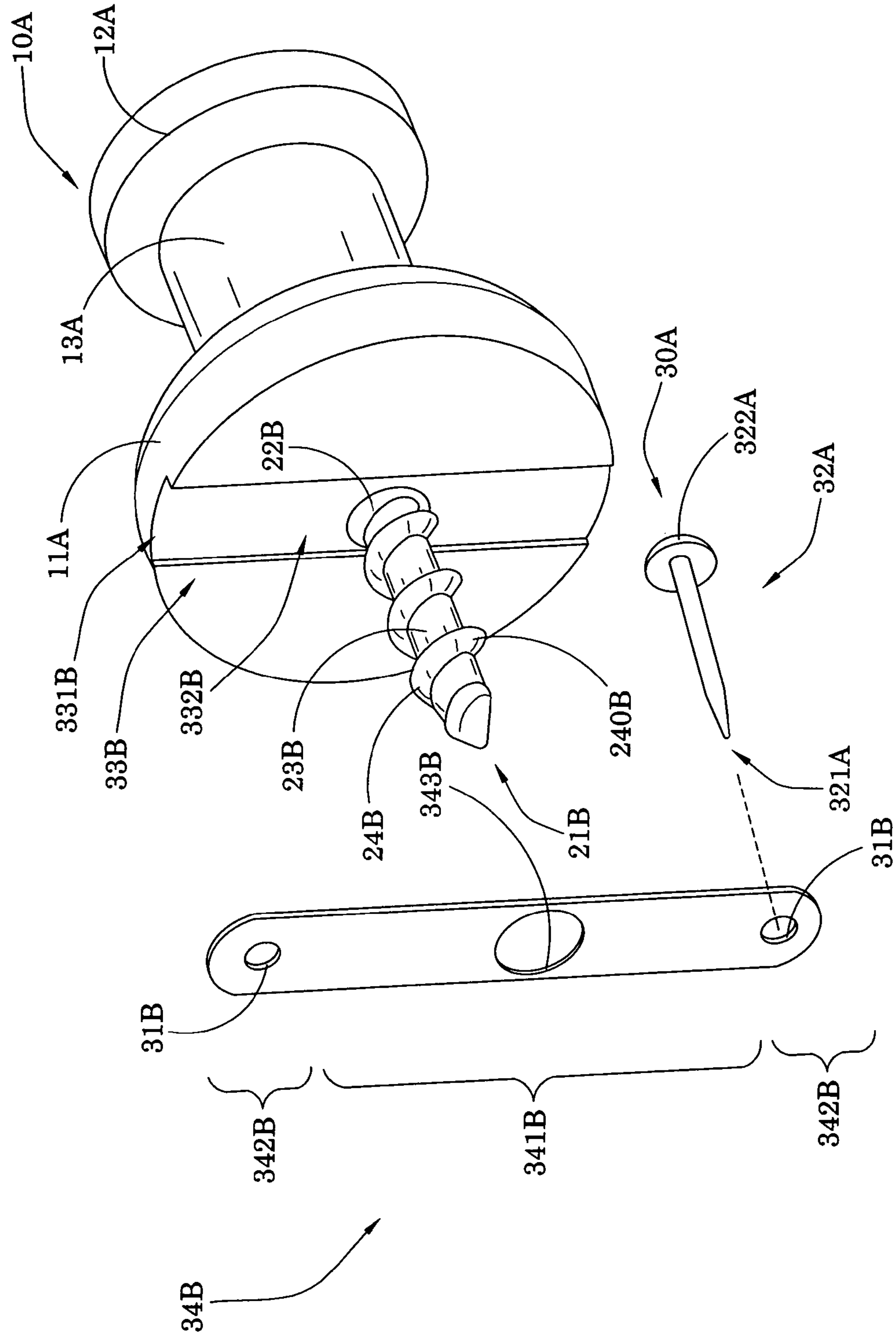
FIG. 8 illustrates an alternative mode of the alternative dry wall hand tool according to the above third preferred embodiment of the present invention.
Figure 9:
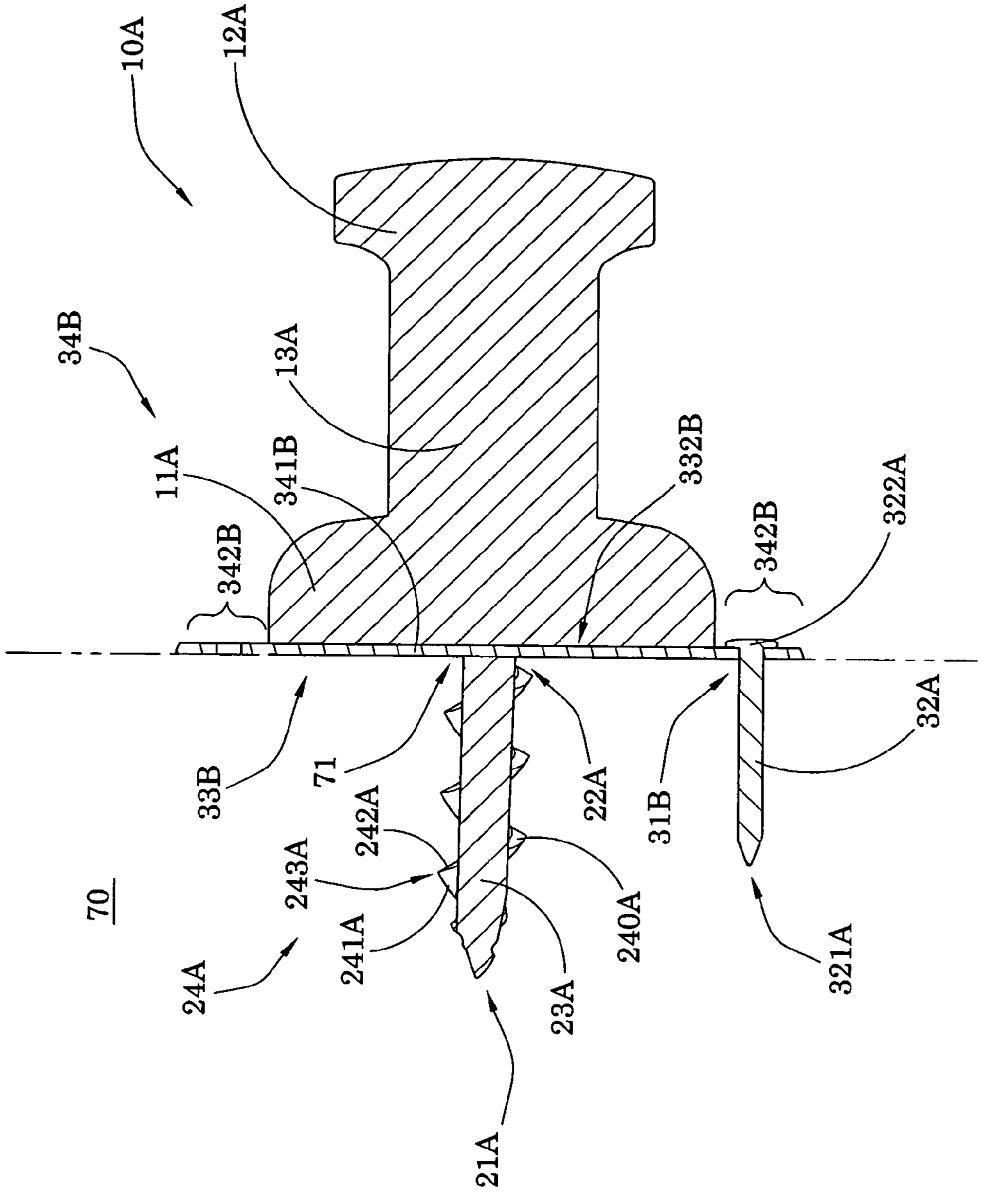
FIG. 9 is a side view of the alternative dry wall hand tool according to the above third preferred embodiment of the present invention.

Referring to FIGS. 8 and 9 of the drawings, an alternative locking arrangement 30B of the dry wall hand tool according to the third preferred embodiment of the present invention is illustrated, wherein at least one indented slot 33B is indentedly formed at the biasing surface 110A at the inner handle member 11A of the pusher handle 10A to form at least one edge notch 331B at the peripheral edge of the inner handle member 11A.

The locking arrangement 30B further comprises a locking member 34B, wherein the locking member 34B has an accommodating portion 341B provided for being placed at the biasing surface 110A of the pusher handle 10A at a position that the accommodating portion 341B of the locking member 34B is fittedly received within the indented slot 33B for interlocking therewith after the penetrating pin 20A is rotatably inserted into the dry wall 70. In other words, the accommodating portion 341B is fittedly accommodated within the indented slot 33B and the dry wall 70 after the dry wall hand tool is being affixed thereat.

The locking member 34B further has a protruding portion 342B integrally extending form the accommodating portion 341B to protrude out of the edge notch 331B of the indented slot 33B at the peripheral edge of the inner handle member 11A. The positioning hole 31B is further provided at the protruding portion 342B of the locking member 34B, in such a manner that when the penetrating pin 20A is penetrating into the dry wall 70 to hang the dry wall hand tool thereat, the retention pin 32A is able to be guided for penetrating into the dry wall through the positioning hole 31B for locking the rotational movement of the dry wall hand tool rotatably moving along the tangent vector of the rotational shaft of the elongated pin body 23A, which preferably has the circular cross section thereof for rotatably driving the penetrating pin 20A breaking into the dry wall 70.

As mentioned above, the indented slot 33B has an indented surface 332B indentedly formed at the biasing surface 110A at the inner handle member 11A, wherein the penetrating pin 20A is preferably extended from the indented surface 332B of the indented slot 33B to integrally protrude out of the biasing surface of the inner handle member 11B. The width of the indented slot 33B is larger than a diameter of the penetrating pin 20A and is larger than a width of the locking member 34B. In addition, the depth of the indented slot 33B should be equal to or larger than the thickness of the locking member 34B.

Accordingly, the locking member 34B further has a through hole 343B having a size and location geometrically matching the circumference of the elongated pin body 23A, such that when the accommodating portion 341B of the locking member 34B is being fittedly received within the indented slot 33B, the penetrating pin 20A is penetrating through the through hole 343B at the accommodating portion 341B of the locking member 34B for interlocking the locking member 34B with the indented slot 33B. Therefore, the locking member 34B is able to be conveniently guided to be accommodated within the indented slot 33B for being interlocking thereby while the pusher handle 10A is being rotatably actuated to drive the penetrating pin 20A breaking into the dry wall 70.

Accordingly, after the accommodating portion 341B of the locking member 34B is being interlocked between the indented slot 33B and the dry wall 70 when the penetrating pin 20A is penetrated into the dry wall 70 to engage the biasing surface 110A therewith, the protruding portion 342B of the locking member 34B is protruded out of the peripheral edge of the inner handle member 11A through the edge notch 331B of the indented slot 33B. Thus, the positioning hole 31B is being fixedly positioned in relation to the inner handle member 11A of the pusher handle 10A after the dry wall hand tool is being fixed at the dry wall 70, so that the retention pin 32A is able to penetrate into the dry wall 70 through the positioning hole 31B to lock the rotational movement along the tangent vector of the elongated pin body 23A, so as to prevent the penetrating pin 20A being loosened to fall off the dry wall 70.

It is appreciated that the positioning hole 31B located at the protruding portion 342B of the locking member 34B is able to increase the distance between the positioning hole 31B and the elongated pin body 23A, so as to maximize the torque force therebetween to optimize the retention force for preventing the undesired rotational movement of the dry wall hand tool.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A dry wall hand tool for being manually affixed on a dry wall, comprising:

a pusher handle adapted for being stably and tightly grabbed and held thereat, wherein said pusher handle has a biasing surface, wherein said pusher handle has at least an indented slot is indentedly formed at said biasing surface of said pusher handle to form at least one edge notch at said peripheral edge of said pusher handle;

a penetrating pin extended from said pusher handle, wherein said penetrating pin comprises an elongated pin body having a tail end portion protruding out from said biasing surface of said pusher handle and a sharp penetrating tip extended from said tail end portion and arranged for initially penetrating into said dry wall to form a hole thereat in a tool-less manner when a rotational pushing hand force is applied at said pusher handle so as to penetrate said pin body into said dry wall until said biasing surface of said pusher handle biases against said dry wall, wherein said penetrating pin further comprises a sharp edge integrally and spirally extended from said tail end portion of pin body towards said sharp penetrating tip at an outer surface of said pin body to assist said penetrating pin being rotatably penetrate into said dry wall; and a locking arrangement which comprises a retention pin slidably extended from said pusher handle at a position that said retention pin is spaced apart from said penetrating pin, wherein said retention pin is arranged for penetrating into said dry wall after said penetrating pin penetrated into said dry wall, such that said pusher handle is securely locked up by said retention pin to prevent said pusher handle being rotated to remove said penetrating pin from said dry wall, wherein said locking arrangement has a positioning hole provided at said pusher handle to guide said retention pin slidably penetrating into said dry wall through said positioning hole, wherein said retention pin, having a sharp tip portion at one end and an enlarged pushing head at an opposed end, is detachably coupled with said pusher handle through said positioning hole to lock up said pusher handle at said dry wall in a rotatably movable manner, wherein said locking arrangement further comprises a locking member having an accommodating portion for being placed at said biasing surface of said pusher handle and a protruding portion extending out of a peripheral edge of said pusher handle member and defining said positioning hole at said protruding portion of said locking member, such that after said penetrating pin is rotatably penetrated into said dry wall, said retention pin is guided for penetrating into said dry wall through said positioning hole so as to lock up said pusher handle, wherein said accommodating portion of said locking member is fittingly received at said indented slot of said pusher handle at a position that said protruding portion of said locking member is extended out of said peripheral edge of said pusher handle through said edge notch.

2. A dry wall hand tool for being manually affixed on a dry wall, comprising:

a pusher handle adapted for being stably and tightly grabbed and held thereat, wherein said pusher handle has a biasing surface, wherein said pusher handle has at least an indented slot is indentedly formed at said biasing surface of said pusher handle to form at least one edge notch at said peripheral edge of said pusher handle;

a penetrating pin extended from said pusher handle, wherein said penetrating pin comprises an elongated pin body having a tail end portion protruding out from said biasing surface of said pusher handle and a sharp penetrating tip extended from said tail end portion and arranged for initially penetrating into said dry wall to form a hole thereat in a tool-less manner when a rotational pushing hand force is applied at said pusher handle so as to penetrate said pin body into said dry wall until said biasing surface of said pusher handle biases against said dry wall, wherein said penetrating pin further comprises a sharp edge integrally and spirally extended from said tail end portion of pin body towards said sharp penetrating tip at an outer surface of said pin body to assist said penetrating pin being rotatably penetrate into said dry wall; and a locking arrangement which comprises a retention pin slidably extended from said pusher handle at a position that said retention pin is spaced apart from said penetrating pin, wherein said retention pin is arranged for penetrating into said dry wall after said penetrating pin penetrated into said dry wall, such that said pusher handle is securely locked up by said retention pin to prevent said pusher handle being rotated to remove said penetrating pin from said dry wall, wherein said locking arrangement has a positioning hole provided at said pusher handle to guide said retention pin slidably penetrating into said dry wall through said positioning hole, wherein said locking arrangement further comprises a locking member having an accommodating portion for being placed at said biasing surface of said pusher handle and a protruding portion extending out of a peripheral edge of said pusher handle member and defining said positioning hole at said protruding portion of said locking member, such that after said penetrating pin is rotatably penetrated into said dry wall, said retention pin is guided for penetrating into said dry wall through said positioning hole so as to lock up said pusher handle, wherein said accommodating portion of said locking member is fittingly received at said indented slot at a position that said protruding portion of said locking member is extended out of said peripheral edge of said pusher handle through said edge notch.

3. The dry wall hand tool, as recited in claim 2, wherein said penetrating pin is extended from an indented surface of said indented slot to protrude out of said biasing surface of said inner handle member, wherein said locking member further has a through hole geometrically matching a circumference of said penetrating pin, so that when said accommodating portion of said locking member is received at said indented slot, said penetrating pin is penetrating through said through hole at said locking member to interlock said locking member with said indented slot at said pusher handle while said protruding portion is protruded from said edge notch for guiding said retention pin penetrating through said positioning hole at said protruding portion of said locking member.

4. The dry wall hand tool, as recited in claim 3, wherein a width of said indented slot is larger than a diameter of said penetrating pin and is larger than a width of said locking member.

5. The dry wall hand tool, as recited in claim 3, wherein said retention pin has a length shorter than a length of said penetrating pin and a circumferential size smaller than a circumferential size of said penetrating pin.

6. The dry wall hand tool, as recited in claim 5, wherein said sharp edge is a continuous helical ridge extended at said outer surface of said pin body in said spiral manner to form a plurality of threads thereon, wherein said threads has higher distribution density near said sharp penetrating tip and less distribution density near said tail end portion of said penetrating pin.

* * * * *